(12) United States Patent
Fang et al.

(10) Patent No.: US 6,680,609 B1
(45) Date of Patent: Jan. 20, 2004

(54) METHOD AND APPARATUS FOR DETERMINING THE MAGNETIC TRACK WIDTH OF A MAGNETIC HEAD

(75) Inventors: Peter Cheng-I Fang, San Jose, CA (US); Terence Tin-Lok Lam, Cupertino, CA (US); Zhong-heng Lin, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/193,514

(22) Filed: Jul. 11, 2002

(51) Int. Cl.[7] .................. G01R 33/12; G11B 5/455
(52) U.S. Cl. ..................... 324/210; 369/53.38
(58) Field of Search ..................... 324/210, 212; 360/6, 25, 31; 29/603.09; 369/53.38

(56) References Cited

U.S. PATENT DOCUMENTS

| | | | |
|---|---|---|---|
| 6,061,195 A | * 5/2000 | Wilson et al. | ............. 360/48 |
| 6,081,114 A | 6/2000 | Shimazawa et al. | |
| 6,249,890 B1 | 6/2001 | Ukani et al. | |
| 6,260,257 B1 | 7/2001 | Emo et al. | |
| 6,265,868 B1 | 7/2001 | Richter | |
| 6,473,254 B1 | * 10/2002 | Hamaguchi et al. | ........ 360/48 |

FOREIGN PATENT DOCUMENTS

JP          59180820          10/1984

* cited by examiner

Primary Examiner—Gerard R. Strecker
(74) Attorney, Agent, or Firm—John J. Oskorep

(57) ABSTRACT

A method of determining a magnetic track width of a magnetic head. The method begins by obtaining a full track profile of the magnetic head which includes a plurality of signal amplitudes read across a track of a magnetic disk at a plurality of magnetic head positions. An initial magnetic track width value is then determined from the full track profile data. Preferably, this initial value is the magnetic write width which is determined based on the difference between left and right head positions which read half of the maximum signal amplitude. To determine the final magnetic write width, the initial value is adjusted with side reading correction values. The side reading correction values are determined based on left and right side reading "tails" of a bell-shaped signal curve which is formed by the full track profile data when graphed. It is not necessary to obtain the microtrack profile to determine these side reading values. Off track read capability (OTRC) and erase band width (EBW) values determined by the triple track test can also be corrected.

20 Claims, 8 Drawing Sheets

METHOD AND APPARATUS FOR DETERMINING THE MAGNETIC TRACK WIDTH OF A MAGNETIC HEAD

BACKGROUND OF THE INVENTION

1. Field of the Invention

This invention relates to methods and apparatus for determining the magnetic track width of a magnetic head.

2. Description of the Related Art

A write head is typically combined with a magnetoresistive (MR) or giant magnetoresistive (GMR) read head to form a merged head, certain elements of which are exposed at an air bearing surface (ABS). The write head is made of first and second pole pieces having first and second pole tips, respectively, which terminate at the ABS. The first and second pole pieces are connected at the yoke by a back gap, whereas the first and second pole tips are separated by a non-magnetic gap layer. An insulation stack, which comprises a plurality of insulation layers, is sandwiched between the first and second pole pieces, and a coil layer is embedded in this insulation stack. A processing circuit is connected to the coil layer for conducting write current through the coil layer which, in turn, induces write fields in the first and second pole pieces. Thus, write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magneteeed segments with fields detectable by the read head.

An MR read head includes an MR sensor sandwiched between first and second non-magnetic gap layers, and located at the ABS. The MR sensor detects magnetic fields from the circular tracks of the rotating disk by a change in resistance that corresponds to the strength of the fields. A sense current is conducted through the MR sensor, where changes in resistance cause voltage changes that are received by the processing circuitry as readback signals. On the other hand, a GMR read head includes a GMR sensor which manifests the GMR effect In the GMR sensor, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. Recorded data can be read from a magnetic medium because the external magnetic field from the recorded magnetic medium (the signal field) causes a change in direction of magnetization in the free layer, which in turn causes a change in resistance of the GMR sensor and a corresponding change in the sensed current or voltage.

One or more merged heads may be employed in a magnetic disk drive for reading and writing information on circular tracks of a rotating disk. A merged head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk.

One important parameter of a magnetic head is its magnetic track width. If a magnetic head has a narrow track width, the tracks along a magnetic disk can also be made narrow. If the tracks on the disk can be made narrow, additional tracks can be formed on the disk to thereby increase its storage capacity. Thus, much emphasis has been placed on making the track widths of magnetic heads as small as possible. In turn, therefore, quick and accurate methods are needed to determine the magnetic widths of magnetic heads with narrow track width sizes. At the present state-of-the-art, magnetic track width sizes are less than 0.3 µm.

Conventional methods for determining the magnetic track width are either (1) quick but inaccurate or (2) accurate but slow, particularly when dealing with magnetic heads having narrow track widths. One conventional method determines the magnetic track width from a full track profile of a magnetic track written on a disk. The full track profile consists of a plurality of signal amplitudes read by the magnetic head across a track of a magnetic disk at a plurality of head positions. The full track profile generally forms a bell-shaped curve when graphed (head position along x-axis, signal level along y-axis). The full track profile magnetic write width $MWW_{FTP}$ may be obtained based on the difference in left and right head positions which read half of the maximum head signal amplitude. Although this method can be performed relatively quickly, it is only accurate when MWW>>MRW (the magnetic read width) and when no side reading of the read sensor exists.

The off-track reading capability (OTRC), which is a measure of how far the read head can go off track without picking up interference from adjacent tracks, and erase band width (EBW) can be found using the well-known "triple-track" method. In this method, a particular track is selected on a disk and two adjacent tracks which surround this track are written to. The middle track is then subsequently written to at a different frequency than the adjacent tracks for a partial erasure. Next, the full track profiles from the adjacent tracks are obtained. Best-fit lines are then fitted on the right side of the left adjacent track profile and on the left side of the right adjacent track profile. The two head positions where these best-fit lines intersect the x-axis are identified, and the difference between these positions is the OTRC. This method also suffers from inaccuracy due to side reading error.

Another conventional method of determining the magnetic track width is the convolution method. In this method, the track width is determined by the convolution of the magnetic signal profile of the written track (assumed to be rectangular) and the micro-track width profile, based on $$FTP(x)=\int R(x-y)MG(y)dy = MTP(x-y)MG(y)dy,$$

where R(x) is the reader response function, MG(x) is the magnetization of the data track, and FTP(x) and MTP(x) are the full and microtrack track profile, respectively. In FIG. 3, a graph 300 of a full track profile 302 and a microtrack profile 304 of the magnetic head is shown. In FIG. 4, a graph 400 of a microtrack profile 402 (which is the microtrack profile of FIG. 3 in a smaller scaling) depicts a mag-netic write width 404 and a magnetic read width 406 of profile 402. In this method, accurate results may be obtained despite the side-reading error. However, this method is too slow for use in production testing. Also, the off-track reading capability (OTRC) and erase band width (EBW) cannot be obtained using this method.

Accordingly, what is needed is a quick and accurate method for determining the magnetic track width of a magnetic head, especially for magnetic heads having very narrow track widths.

SUMMARY OF THE INVENTION

A quick and accurate method of determining the magnetic track width of a magnetic head is described herein. A full track profile of a magnetic track is obtained using the magnetic head. The full track profile includes a plurality of signal amplitudes read across a track of a magnetic disk at a plurality of magnetic head positions. Next, an initial track width value is determined from the full track profile data. Preferably, the initial value is the magnetic write width ($MWW_{FTP}$) which is determined based on the difference in left and right head positions which read half of the maximum head signal level. This initial track width value is then adjusted with side reading correction values for determining the magnetic track width. The side reading correction values are based on an analysis of side reading "tails" of the bell-shaped signal curve that is formed by the track profile data when graphed.

In one particular embodiment, the correction value for the left side reading tail ($C_{SRL}$) is $\Delta Y_L/a_L$ and the correction value for the right side reading tail ($C_{SRR}$) is $\Delta Y_R/a_R$, respectively, such that the magnetic track width $MWW = MWW_{FTP} - C_{SRL} - C_{SRR}$. The values $a_L$ and $a_R$ are slopes of best-fit lines fitted over left and right sides of the bell-shaped curve ($Y_L = a_L * X_{offset} + b_L$ and $Y_R = a_R * X_{offset} + b_R$), respectively. The values $\Delta Y_L$ and $\Delta Y_R$ are obtained based on equations $\Delta Y_L = A_L(S_L) - (\partial A_L + \partial A_R)/2$ and $\Delta Y_R = A_R(S_R) - (\partial A_L + \partial A_R)/2$, respectively, where $\partial A_L = A_L(S_L) - A_L(S_L - X)$ and $\partial A_R = A_R(S_R) - A_R(S_R + X)$; $S_L$ and $S_R$ are head offset positions that reflect where the best-fit lines and the side reading tails begin to deviate; $A_L$ and $A_R$ are signal amplitudes at specified head positions; and $X = (MWW_{FTP} - MRW)/2$.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
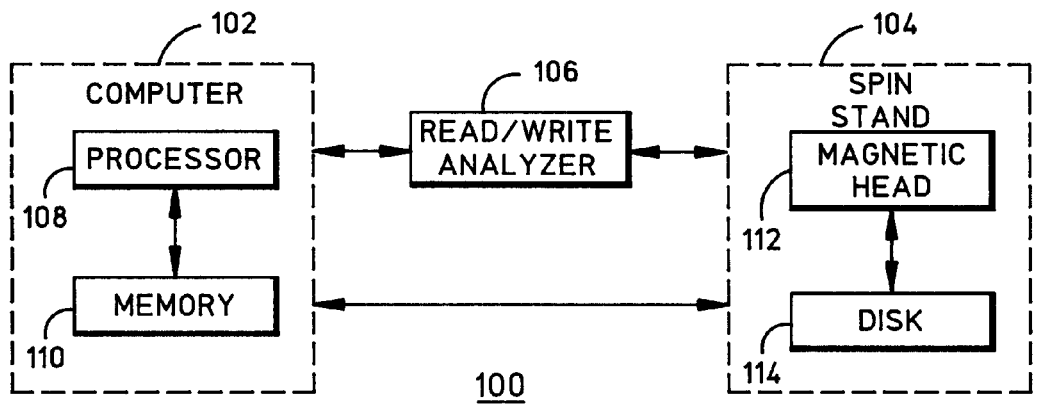
FIG. 1 is a schematic block diagram of a system for determining a magnetic track width of a magnetic head.

A system 100 for determining a magnetic track width of a magnetic head is shown in FIG. 1. The system 100 in FIG. 1 includes a computer 102, a spinstand 104, and a read/write analyzer 106. Computer 102 is coupled to spinstand 104 and read/write analyzer 106 through serial ports (not shown). Read/write analyzer 106 is also coupled to spinstand 104 through serial ports (not shown). Spinstand 104, which includes a replaceable magnetic head 112 and a replaceable magnetic disk 114, is basically a conventional disk drive device used for determining the magnetic track width of a magnetic head. Such a spinstand 104 may be obtained from, for example, Guzik Technical Enterprises of Mountain View, Calif., U.S.A. (e.g., Model #S-1701B). Read/write analyzer 106 is basically a conventional signal analyzer device which serves to measure, read, and write signals to and from spinstand 104. These signals are converted from digital to analog (D/A) and analog to digital (A/D) as necessary. Such a read/write analyzer 106 may be obtained from, for example, Guzik Technical Enterprises of Mountain View, Calif., U.S.A. (e.g., Model #RWA-2585S PMRL 1G).

Computer 102 may be a general purpose computer, such as a personal computer (PC), which includes one or more processors 108 (or controllers) and memory 110. Memory 110 may be a disk, such as a hard disk, computer diskette, or compact disc (CD), or alternatively be memory of an integrated circuit (IC) device or processor which is a permanent part of computer 102. Computer 102 includes software (i.e. computer instructions) which resides in memory 110 and provides general control for system 100. For example, the software instructs spinstand 104 to move magnetic head 112 to particular positions on magnetic disk 114, write data to disk 114 at particular frequencies, and read data from disk 114. Given the appropriate track profile data, the computer instructions also perform calculations to determine the magnetic track width of magnetic head 112 in accordance with the present invention. The logic and calculations performed by the software are described below in detail. The software may be implemented in any suitable computer language, such as Visual Basic or Visual C++.

Figure 2A:
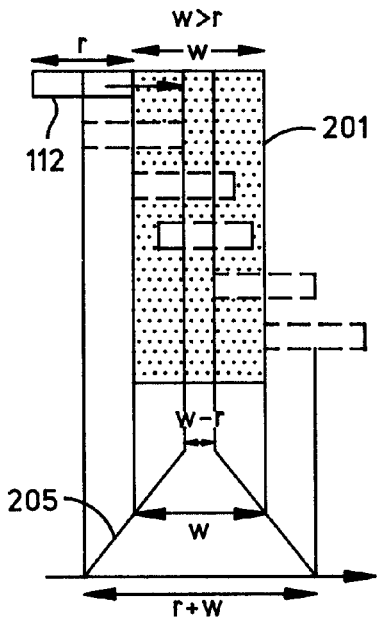
FIG. 2A is an illustration of an ideal track profile of a magnetic head obtained from reading signal amplitudes measured at a plurality of magnetic head positions over a track of a magnetic disk.

FIG. 2A is an illustrative example of an ideal track profile 205 of magnetic head 112 of FIG. 1, where the write track width is made greater than the read track width. Ideal track profile 205 is obtained as magnetic head 112 reads signal amplitudes across a track 201 of a magnetic disk, which is illustrated by dashed-line representations of magnetic head 112 that extend from left to right in the figure. Track profile 205 is ideal in that it is not affected by any side reading from the magnetization of the positions that are not covered by the reader physically. Being ideal, track profile 205 is shown to have a short flat top and straight-lined sides with constant slopes.

As illustrated in FIG. 2A, the magnetic write width (w) is equal to the magnetic width of track 201 whereas the magnetic read width (r) is equal to the width of a step function which represents an ideal reader response to magnetic fields. As indicated, the magnetic write width can be obtained by calculating the difference between the left and right head positions at half (½) of the maximum signal amplitude. Put another way, the magnetic write width from the full track profile ($MWW_{FTP}$) can be found by identifying a maximum value in the plurality of signal amplitudes; identifying left and right side magnetic head positions $X_{L1}$ and $X_{R1}$ that correspond to half of the identified maximum value; and finding a difference $\Delta X_1$ between $X_{L1}$ and $X_{R1}$. On the other hand, the magnetic read width can be obtained by calculating the difference between the left and right head positions at zero signal amplitude (which is r+w), and then subtracting the magnetic write width from this value. Put another way, the magnetic read width from the full track profile ($MRW_{FTP}$) can be found by identifying left and right side magnetic head positions $X_{L2}$ and $X_{R2}$ that correspond to a signal level of zero; finding a difference $\Delta X_2$ between $X_{L2}$ and $XR_2$; and finding a difference between $\Delta X_2$ and $MWW_{FTP}$.

Figure 2B:
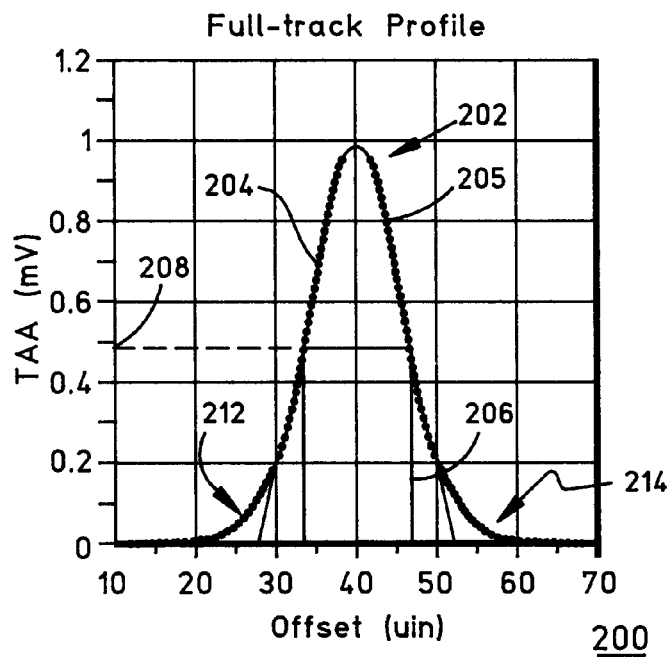
FIG. 2B is a graph showing a full track profile of a magnetic head, as well as equations for obtaining a magnetic track width from the full track profile.
Figure 3:
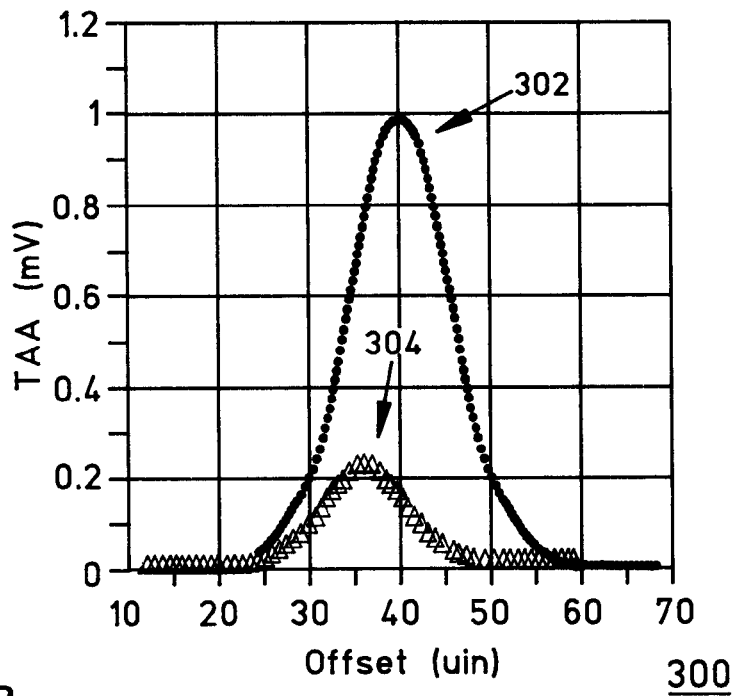
FIG. 3 is a graph showing the full track profile and a microtrack profile of the magnetic head.
Figure 4:
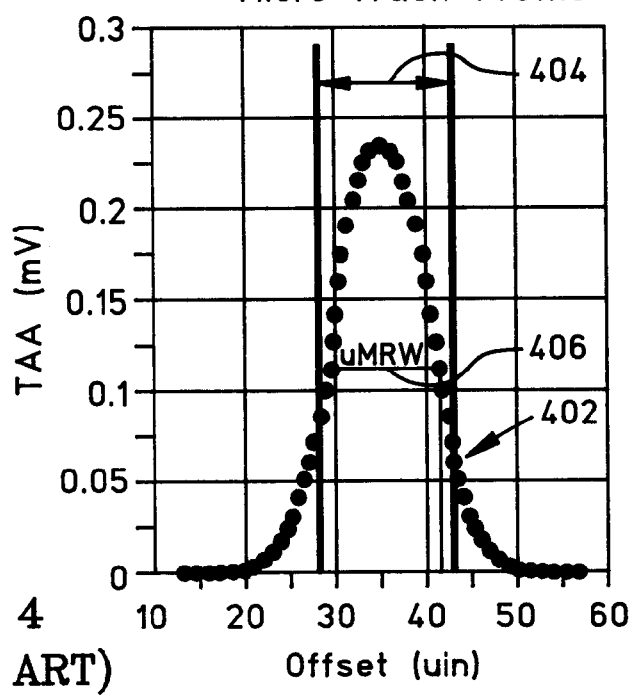
FIG. 4 is a graph of the microtrack profile of FIG. 3 at a smaller scaling.

An ideal track profile, however, is difficult if not impossible to obtain. The full track profile is typically affected by side reading of the reader. This side reading error becomes relatively large percentage-wise when the write width becomes relatively small. FIG. 2B is a graph 200 showing a more realistic full track profile 202. Full track profile 202 consists of a plurality of signal amplitudes read across a track of a magnetic disk at a plurality of head positions. The plurality of signal amplitudes are represented along the y-axis in track average amplitude (TAA), and the plurality of head positions are represented along the x-axis in micro-inches (μin) as offsets from track center.

As shown in FIG. 2B, the data of full track profile forms a bell-shaped curve. Best-fit straight lines 204 and 205 of FIG. 2B are fit along left and right sides of this bell-shaped curve, which represent the straight-lined sides of an ideal profile. As shown, a left side reading tail 212 exists to the left of best-fit line 204, and a right side reading tail 214 exists to the right of best-fit line 205. Side reading tail data is hereby defined as that data that exist outside of the best-fit lines fitted along the left and right sides of the bell-shaped curve. These tails are caused by side reading which also widens the full track profile. Due to the side reading, the data and therefore the calculations for determining a magnetic write width 206 based on a half maximum amplitude level 208 described above in relation to FIG. 2A are not entirely accurate. The track width calculation error due to side reading becomes larger percentage-wise when the track width becomes smaller.

Figure 5:
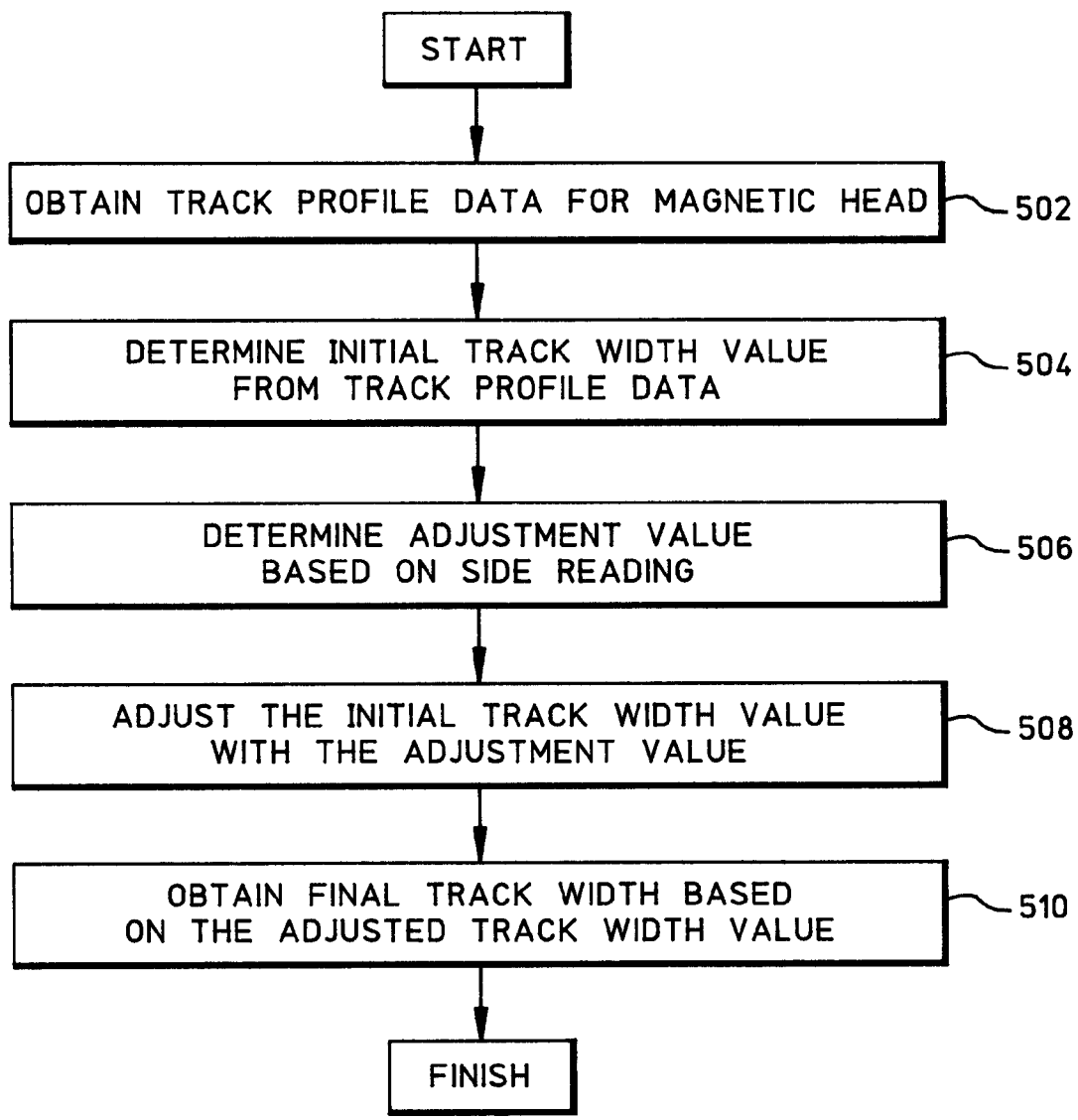
FIG. 5 is a flowchart which describes a method of determining a magnetic track width of a magnetic head in accordance with the present invention.

FIG. 5 is a flowchart which describes a method of determining a magnetic write width of a magnetic head in accordance with the present invention, which solves the problem of the prior art methods. This method is implemented in the system of FIG. 1 with software, which is stored in memory and executed by one or more processors. Referring back to the flowchart of FIG. 5, the track profile data for the magnetic head are obtained (step 502). The track profile data include a plurality of signal amplitudes read across a track of a magnetic disk at a plurality of magnetic head positions. In this embodiment, the track profile data is the full track profile data of the magnetic head obtained from the read/write analyzer and spinstand of FIG. 1. The plurality of signal amplitudes of the full track profile form a bell-shaped signal curve when graphed over the plurality of magnetic head positions (e.g., see FIG. 2B).

Next, an initial track width value is determined from the full track profile data using the conventional method (step 504). In this embodiment, the initial track width value is the magnetic write width, referred to as $MWW_{FTP}$, which is determined by the software from the full track profile. For example, $MWW_{FTP}$ may be obtained by identifying a maximum value in the plurality of signal amplitudes; identifying left and right side magnetic head positions $X_{L1}$ and $X_{R1}$ that correspond to half of the identified maximum value; and then finding a difference $\Delta X_1$ between $X_{L1}$ and $X_{R1}$. Thus, the relation may be represented as $MWW_{FTP}=(X_{R1}-X_{L1})$.

Correction values are then determined based on analyzing side reading tail data in the full track profile (step 506). The analysis of side reading tails and the determination of correction values are described in a detailed analysis below. The initial track width value is adjusted with these correction values (step 508), and the final magnetic track width is obtained (step 510).

To obtain the correction values, the magnetic read width from the full track profile ($MRW_{FTP}$) is determined. The magnetic read width $MRW_{FTP}$ is found by first fitting left and right best-fit lines along left and right sides of the bell-shaped signal curve, respectively (see e.g., FIG. 2B). Once the best-fit lines are obtained, left and right side magnetic head positions $X_{L2}$ and $X_{R2}$ that correspond to a signal amplitude of zero along the left and right best-fit lines are identified. The difference $\Delta X_2$ between $X_{L2}$ and $X_{R2}$ is then found, and the $MRW_{FTP}$ is obtained by calculating the difference between $\Delta X_2$ and $MWW_{FTP}$. The relation may be summarily represented as $MRW_{FTP}=(X_{R2}-X_{L2})-MWW_{FTP}=(X_{R2}-X_{L2})-(X_{R1}-X_{L1})$.

To obtain the actual magnetic write width MWW, two correction values $C_{SRL}$ and $C_{SRR}$ are determined and used to adjust the initial track width value (here, $MWW_{FTP}$). $C_{SRL}$ is the correction value for the left side reading tail and $C_{SRR}$ is the correction value for the right side reading tail. Once these correction values are obtained, the full track profile magnetic write width $MWW_{FTP}$ is adjusted based on the relation $MWW=MWW_{FTP}-C_{SRL}-C_{SRR}$.

Figure 6:
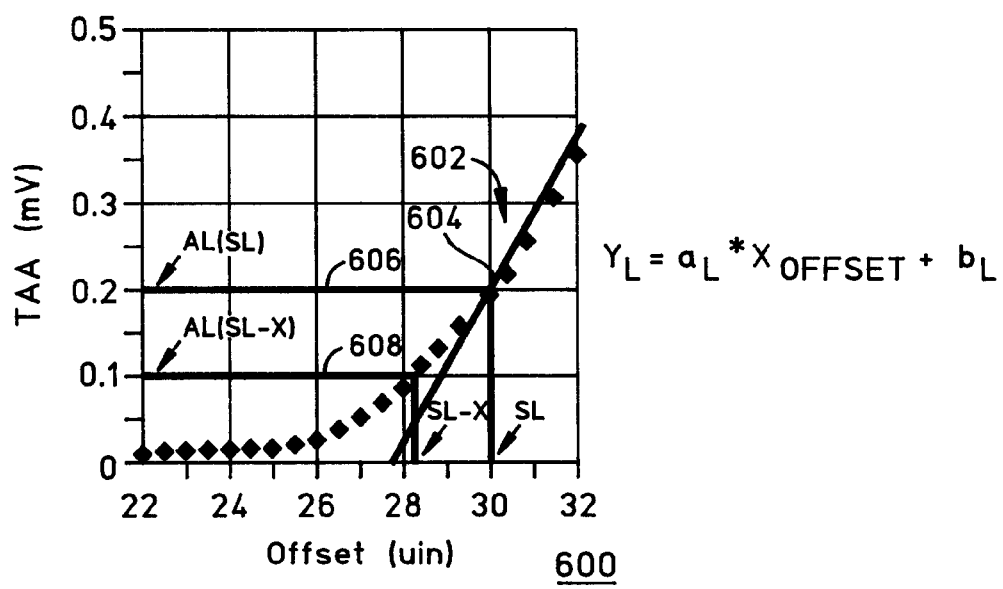
FIG. 6 is a graph which shows side reading tail data of a full track profile.

FIG. 6 is a graph 600 which shows side reading tail data 602 of a full track profile. Although only one side reading tail is shown for analysis (i.e., the left side reading tail), both left and right side reading tails are analyzed to obtain each correction value $C_{SRL}$ and $C_{SRR}$. The correction values $C_{SRL}$ and $C_{SRR}$ are more specifically determined based on the relations $C_{SRL}=\Delta Y_L/a_L$ and $C_{SRR}=\Delta Y_R/a_R$. Here, $\Delta Y_L=A_L(S_L)-(\partial A_L+\partial A_R)/2$ and $\Delta Y_R=A_R(S_R)-(\partial A_L+\partial A_R)/2$, where $\partial A_L=A_L(S_L)-A_L(S_L-X)$ and $\partial A_R=A_R(S_R)-A_R(S_R+X)$. $A_L$ and $A_R$ are signal amplitudes corresponding to particular magnetic head positions for the left and right side reading tails, respectively; $a_L$ and $a_R$ are slopes of the left and the right best-fit lines, respectively; and $X=(MWW_{FTP}-MRW_{FTP})/2$.

In FIG. 6, best-fit line 604 is shown fitted over the side reading tail data 602 and may be represented by the equation $Y_L=a_L*X_{offset}+b_L$. $S_L$ and $S_R$ are head positions that correspond to the point at which the left and right side reading tails of the bell-shaped curve begin to deviate from the left and the right best-fit lines, respectively. Since FIG. 6 shows the left side reading tail, a representative value of $S_L$ is shown. The signal amplitude value of $A_L(S_L)$ is identified by an extending line 606 which corresponds to head position $S_L$, and the signal level value of $A_L(S_L-X)$ is identified by an extending line 608 which corresponds to head position $(S_L-X)$. Similar analysis of the right side reading tail (not shown in FIG. 6) determines the signal amplitude values of $A_R(S_R)$ and $A_R(S_R+X)$, using the best fit line represented by $Y_R=a_R*X_{offset}+b_R$.

Figure 7:
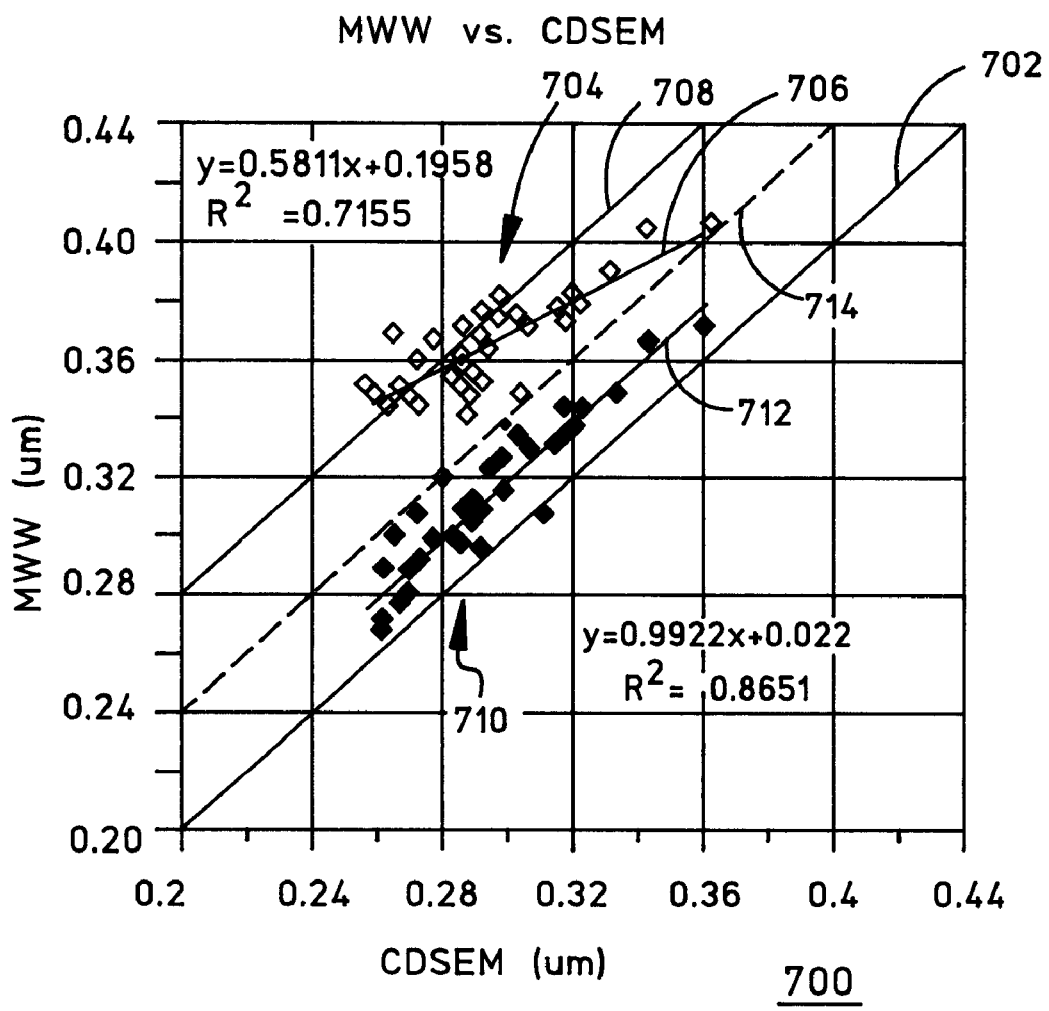
FIG. 7 is a graph which compares magnetic track widths obtained by the present invention and the measured physical track widths.

The above calculations used to find MWW can be quickly executed and the results are highly accurate. FIG. 7 is a graph 700 which compares write widths obtained by the present invention and those that were actually measured physically with a critical dimension scanning electron microscope (CDSEM). A 45° line 702 shown in FIG. 7 represents the actual physical write width, which is typically smaller than the magnetic write width, such that measured track width data will generally lie above 45° line 702. Magnetic write width data is shown in graph 700 as diamonds, two diamonds for each magnetic head. More particularly, conventional write width data 704 from three wafers are denoted by hollow diamonds and shown generally above inventive write width data 710 which are from the same three wafers and denoted by solid diamonds. A straight line 706 is fitted to conventional write width data 704, and a straight line 712 is fitted to inventive write width data 710. Note that straight line 712 (invention) lies closer to and parallel with 45° line 702, which is desirable, whereas straight line 706 (conventional) lies further away from and not parallel with 45° line 702. Straight lines 708 and 714 are parallel with line 702 and away from line 702 a distance of 0.08 and 0.04nm, respectively. These two lines are used to identify how close the above two types of data are to the actual physical head write width.

Figure 8:
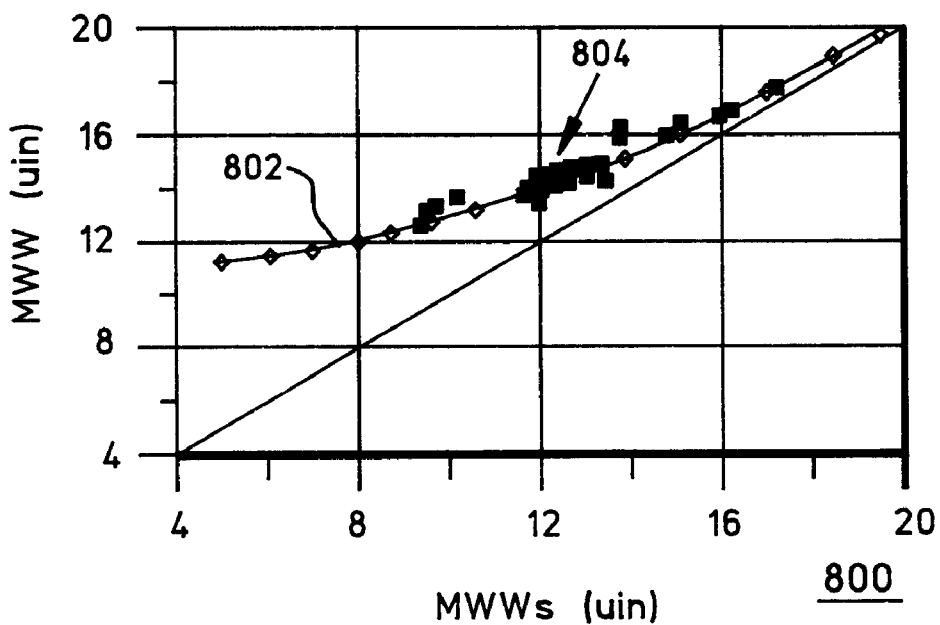
FIG. 8 is a graph which compares magnetic track widths obtained by the present invention and theoretically calculated track widths.
Figure 9:
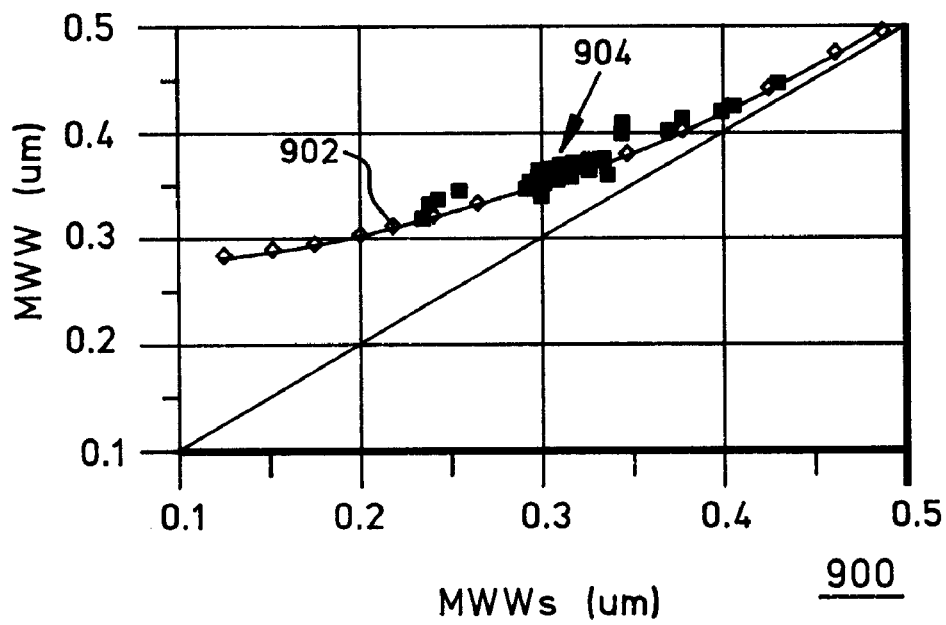
FIG. 9 is another graph which is the same as FIG. 8 except it uses micrometers ($\mu$m) instead of microinches ($\mu$in) for the units.

To further illustrate the accuracy obtained, FIGS. 8 and 9 are graphs 800 and 900 which compare theoretically calculated write widths (using convolution integral and average magnetic read width) and magnetic write widths obtained by the present invention. Graphs 800 and 900 are different only in the units utilized; graph 800 uses microinches ($\mu$in) whereas graph 900 uses micrometers ($\mu$m). Theoretical magnetic write widths are graphed in FIG. 8 (clear diamonds) and a curve 802 was fitted to this data. Write width data 804 obtained by the present invention was also graphed in FIG. 8 (solid squares). Note how closely experimental write width data 804 fits along theoretical write width curve 802. The same data exists in graph 900 of FIG. 9, which shows a theoretical write width curve 902 and experimental write width data 904 obtained by the present invention.

Figure 10:
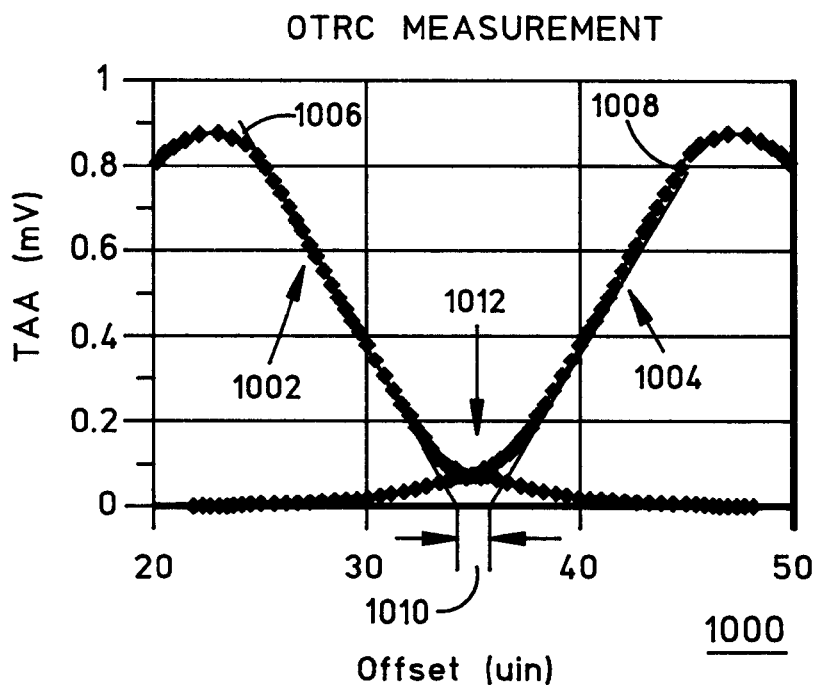
FIG. 10 is a graph which shows full track profile data of two tracks which lie adjacent to and surround a middle track, used for determining an off-track read capability (OTRC) of a magnetic head.
Figure 11:
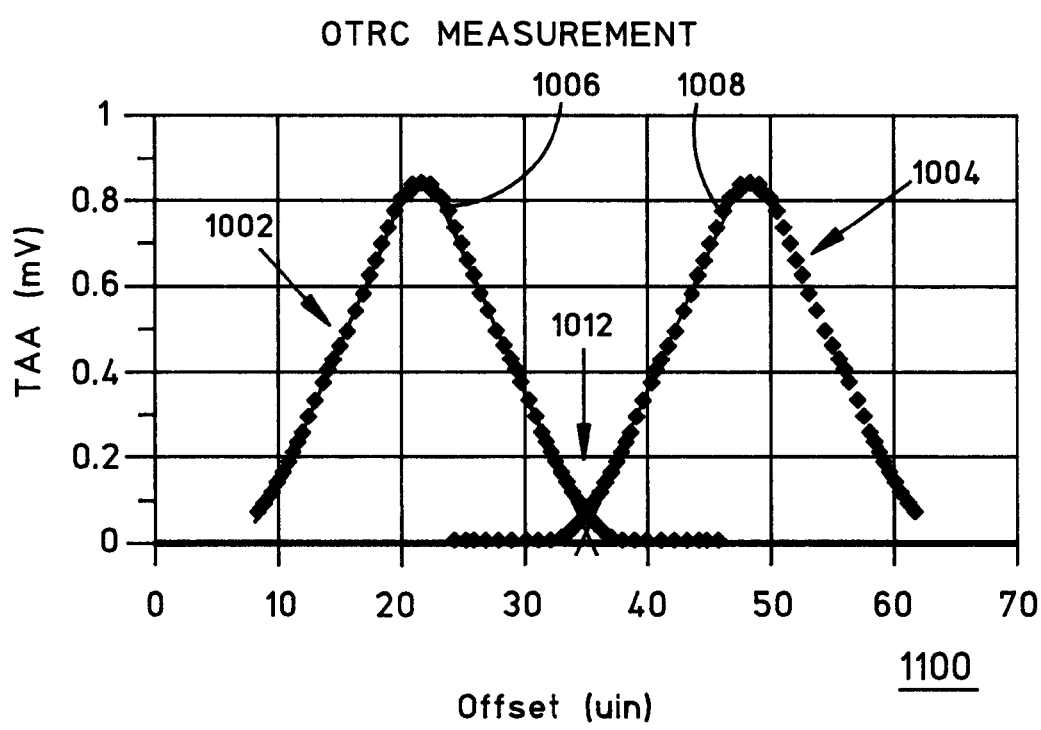
FIG. 11 is a graph which shows the full track profile data of FIG. 10, scaled up to show fuller views of the track profiles of the two tracks.

The off-track read capability (OTRC) for the magnetic head may also be obtained in a relatively accurate manner. FIGS. 10 and 11 show a graph 1000 (smaller scale) and a graph 1100 (larger scale), respectively, which reveal the full track profile data of two tracks which lie adjacent to and surround a middle track. In accordance with a conventional method, a middle track is selected on the disk and two adjacent tracks which lie adjacent to this track are written to. The middle track is then subsequently written to at a different frequency than the adjacent tracks for a partial erasure. The full track profiles from the adjacent tracks are then obtained, shown as track profile data 1002 and 1004 in FIGS. 10 and 11. Best-fit lines 1006 and 1008 are then fitted on the right side of the left adjacent track profile 1002 and on the left side of the right adjacent track profile 1004, respectively. The two head positions where best-fit lines 1006 and 1008 intersect with the x-axis are identified, and the difference between these head positions is two times (2×)

the OTRC 1010 as indicated in FIG. 10. Side reading tail data 1012 are also shown in the figures.

As apparent from the figures, the side reading shifts lines 1006 and 1008 and interferes with the conventional analysis to thereby produced inaccurate OTRC data. The greater the side reading the closer lines 1006 and 1008 become, which reduces the value of the OTRC. In accordance with the present invention, an OTRC value with side-reading correction ("OTRCs") can be determined based on the initial OTRC value described above plus half of the sum of two side-reading correction values $C_{SRL}$ and $C_{SRR}$. An EBW value with side-reading correction can also be obtained using the relation OTRCs=EBW+DWR. DWR is the "differential write and read width" found by DWR=(MWW$_s$-MRW$_{FTP}$)/2, where MWW$_s$ is the MWW obtained in accordance with the present invention.

Figure 12:
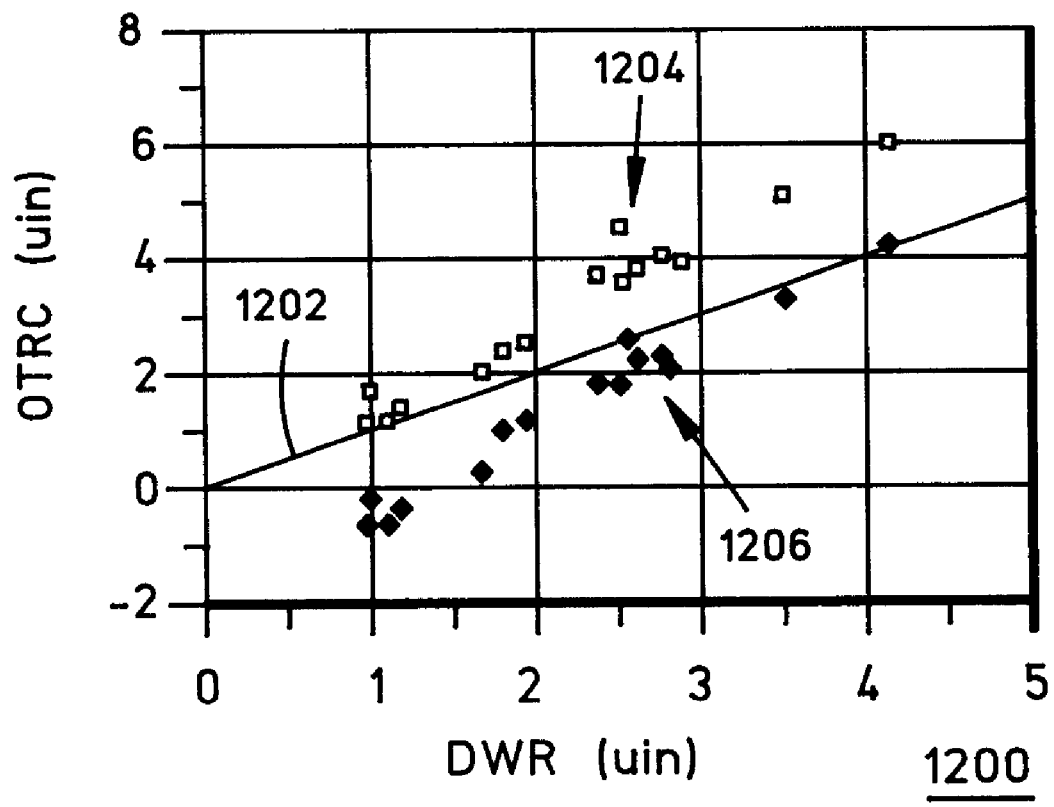
FIG. 12 is a graph which compares OTRCs obtained by the present invention and conventionally calculated OTRCs.

As with the magnetic write widths, the OTRC obtained in accordance with the present invention is accurate. FIG. 12 is a graph which compares OTRCs obtained by the present invention and those obtained using the conventional method. The x-axis is the DWR in microinches ($\mu$in), and the y-axis is the OTRC in microinches ($\mu$in). Conventional OTRC data 1206, shown as solid diamonds for each magnetic head, generally lies below a 45° line 1202 which results in abnormal negative EBW. Note also that some of these conventional OTRC data 1206 have negative values, which is not physically possible. On the other hand, inventive OTRC data 1204, shown as hollow squares for each magnetic head, generally lies above 45° line 1202 as they should be.

Thus, a quick and accurate method of determining a magnetic track width of a magnetic head has been described. First, a full track profile for the magnetic head is obtained. This full track profile data includes a plurality of signal amplitudes read across a track of a magnetic disk at a plurality of magnetic head positions. Next, an initial write width value (having no side reading correction) is determined from the full track profile data. Preferably, the initial magnetic write width from the full track profile (MWW$_{FTP}$) is determined based on the difference in left and right head positions which read half of the maximum head signal amplitude. The initial write width value is then adjusted with side reading correction values for determining the magnetic write width. The side reading correction values are based on an analysis of side reading "tails" of the bell-shaped signal curve that is formed by the full track profile data when graphed.

In one particular embodiment, the correction value for the left side reading tail is $\Delta Y_L/a_L$ and the correction value for the right side reading tail is $\Delta Y_R/a_R$, respectively, such that the magnetic write width MWW=MWW$_{FTP}$–$\Delta Y_L/a_L$ –$\Delta Y_R/a_R$. The values $a_L$ and $a_R$ are slopes of best-fit lines fitted over left and right sides of the bell-shaped curve ($Y_L=a_L*X_{offset}+b_L$ and $Y_R=a_R*X_{offset}+b_R$), respectively. The values $\Delta Y_L$ and $\Delta Y_R$ are obtained based on equations $\Delta Y_L=A_L(S_L)-(\partial A_L+\partial A_R)/2$ and $\Delta Y_R=A_R(S_R)-(\partial A_L+\partial A_R)/2$, respectively, where $\partial A_L=A_L(S_L)-A_L(S_L-X)$ and $\partial A_R=A_R(S_R)-A_R(S_R+X)$; $S_L$ and $S_R$ are head offset positions that reflect where the best-fit lines and the side reading tails begin to deviate; $A_L$ and $A_R$ are signal amplitudes at specified head positions; and X=(MWW$_{FTP}$–MRW$_{FTP}$)/2.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A method of determining a magnetic write width of a magnetic head, comprising:

obtaining full track profile data for the magnetic head;

determining an initial write width value from the full track profile data;

determining one or more side reading correction values from the full track profile data; and adjusting the initial write width value with the one or more side reading correction values for determining the magnetic write width.

2. The method of claim 1, further comprising:

wherein the full track profile data comprises a plurality of signal amplitudes read across a track of a magnetic disk at a plurality of magnetic head positions.

3. The method of claim 1, further comprising:

wherein the full track profile data comprises a plurality of signal amplitudes read across a track of a magnetic disk at a plurality of magnetic head positions;

wherein the plurality of signal amplitudes form a bell-shaped signal curve when graphed over the plurality of magnetic head positions; and wherein the act of determining the one or more side reading correction values comprises analyzing side reading tail data from the bell-shaped signal curve.

4. The method of claim 1, further comprising:

wherein the full track profile data comprises a plurality of signal amplitudes read across a track of a magnetic disk at a plurality of magnetic head positions;

wherein the act of determining the initial write width value comprises the further acts of:

identifying a maximum value in the plurality of signal amplitudes; and finding a difference between left and right magnetic head positions that correspond to half of the identified maximum value.

5. The method of claim 1, further comprising:

wherein the full track profile data comprises a plurality of signal amplitudes read across a track of a magnetic disk at a plurality of magnetic head positions;

wherein the plurality of signal amplitudes form a bell-shaped signal curve when graphed over the plurality of magnetic head positions;

wherein the act of determining the initial write width value comprises determining a magnetic write track width $MWW_{FTP}$ which includes the further acts of:

identifying a maximum value in the plurality of signal amplitudes;

identifying left and right side magnetic head positions $X_{L1}$ and $X_{R1}$ that correspond to half of the identified maximum value;

finding a difference $\Delta X_1$ between $X_{L1}$ and $X_{R1}$;

determining a magnetic read width $MRW_{FTP}$ by:

determining left and right best-fit lines along on left and right sides of the bell-shaped signal curve, respectively;

identifying, along the left and the right best-fit lines, left and right side magnetic head positions $X_{L2}$ and $X_{R2}$ that correspond to a magnetic head signal level of zero;

finding a difference $\Delta X_2$ between $X_{L2}$ and $XR_2$; and finding a difference between $\Delta X_2$ and $MWW_{FTP}$.

6. The method of claim 1, further comprising:

wherein the full track profile data comprises a plurality of signal amplitudes read across a track of a magnetic disk at a plurality of magnetic head positions;

wherein the plurality of signal amplitudes form a bell-shaped signal curve when graphed over the plurality of magnetic head positions;

determining left and right best-fit lines along left and right sides of the bell-shaped signal curve, respectively;

wherein the act of determining the initial write width value comprises determining a magnetic write track width $MWW_{FTP}$;

determining a magnetic read width $MRW_{FTP}$ from the full track profile data;

wherein the act of determining the one or more side reading correction values, $C_{SRL}$ and $C_{SRR}$, comprises the further acts of:

identifying left and right magnetic head positions $S_L$ and $S_R$, respectively, that correspond to where left and right side reading tails of the bell-shaped curve begin to deviate from the left and the right best-fit lines;

determining $C_{SRL} = \Delta Y_L/a_L$ and $C_{SRR} = \Delta Y_R/a_R$, where:

$\Delta Y_L = A_L(S_L) - (\partial A_L + \partial A_R)/2$ and $\Delta Y_R = A_R(S_R) - (\partial A_L + \partial A_R)/2$, $\partial A_L = A_L(S_L) - A_L(S_L - X)$ and $\partial A_R = A_R(S_R) - A_R(S_R + X)$, $A_L$ and $A_R$ are signal amplitudes corresponding to particular magnetic head positions, $a_L$ and $a_R$ are slopes of the left and the right best-fit lines, respectively, and $X = (MWW_{FTP} - MRW_{FTP})/2$.

7. The method of claim 1, further comprising:

wherein the full track profile data comprises a plurality of signal amplitudes read across a track of a magnetic disk at a plurality of magnetic head positions;

wherein the plurality of signal amplitudes form a bell-shaped signal curve when graphed over the plurality of magnetic head positions;

wherein the act of determining the initial write width value comprises determining a magnetic write track width $MWW_{FTP}$ which includes the further acts of:

identifying a maximum value in the plurality of signal amplitudes;

identifying left and right side magnetic head positions $X_{L1}$ and $X_{R1}$ that correspond to half of the identified maximum value;

finding a difference $\Delta X_1$ between $X_{L1}$ and $X_{R1}$;

determining a magnetic read width $MRW_{FTP}$ by:

determining left and right best-fit lines along left and right sides of the bell-shaped signal curve, respectively;

identifying, along the left and the right best-fit lines, left and right side magnetic head positions $X_{L2}$ and $X_{R2}$ that correspond to a magnetic head signal amplitude of zero;

finding a difference $\Delta X_2$ between $X_{L2}$ and $X_{R2}$;

finding a difference between $\Delta X_2$ and $MWW_{FTP}$;

wherein the act of determining the one or more side reading correction values, $C_{SRL}$ and $C_{SRR}$, comprises the further acts of:
- identifying left and right magnetic head positions $S_L$ and $S_R$, respectively, that correspond to where left and right side reading tails of the bell-shaped curve begin to deviate from the left and the right best-fit lines;
- determining $C_{SRL}=\Delta Y_L/a_L$ and $C_{SRR}=\Delta Y_R/a_R$, where:

$\Delta Y_L=A_L(S_L)-(\partial A_L+\partial A_R)/2$ and $\Delta Y_R=A_R(S_R)-(\partial A_L+\partial A_R)/2$, $\partial A_L=A_L(S_L)-A_L(S_L-X)$ and $\partial A_R=A_R(S_R)-A_R(S_R+X)$,

- $A_L$ and $A_R$ are signal amplitudes corresponding to particular magnetic head positions,
- $a_L$ and $a_R$ are slopes of the left and the right best-fit lines, respectively,
- $X=(MWW_{FTP}-MRW_{FTP})/2$; and wherein the act of adjusting the initial write width value comprises adjusting $MWW_{FTP}$ for determining MWW based on $MWW=MWW_{FTP}-C_{SRL}-C_{SRR}$.

8. A computer program product, comprising:
- a computer storage medium;
- computer instructions stored on the computer storage medium;
- the computer instructions for:
  - obtaining full track profile data for a magnetic head;
  - determining an initial write width value from the full track profile data;
  - determining one or more side reading correction values from the full track profile data; and
  - adjusting the initial write width value with the one or more side reading correction values for determining a magnetic write width of the magnetic head.

9. The computer program product of claim 8, further comprising:
- wherein the full track profile data comprises a plurality of signal amplitudes read across a track of a magnetic disk at a plurality of magnetic head positions.

10. The computer program product of claim 8, further comprising:
- wherein the full track profile data comprises a plurality of signal amplitudes read across a track of a magnetic disk at a plurality of magnetic head positions;
- wherein the plurality of signal amplitudes form a bell-shaped signal curve when graphed over the plurality of magnetic head positions; and
- wherein the computer instructions determine the one or more side reading correction values by analyzing side reading tail data of the bell-shaped signal curve.

11. The computer program product of claim 8, further comprising:
- wherein the full track profile data comprises a plurality of signal amplitudes read across a track of a magnetic disk at a plurality of magnetic head positions, and wherein the computer instructions determine the initial write width value by:
  - identifying a maximum value in the plurality of signal amplitudes; and
  - finding a difference between left and right magnetic head positions that correspond to half of the identified maximum value.

12. The computer program product of claim 8,
- wherein the full track profile data comprises a plurality of signal amplitudes read across a track of a magnetic disk at a plurality of magnetic head positions;
- wherein the plurality of signal amplitudes form a bell-shaped signal curve when graphed over the plurality of magnetic head positions;
- wherein the computer instructions determine the initial write width value by determining a magnetic write track width $MWW_{FTP}$ which includes the acts of:
  - identifying a maximum value in the plurality of signal amplitudes;
  - identifying left and right side magnetic head positions $X_{L1}$ and $X_{R1}$ that correspond to half of the identified maximum value;
  - finding a difference $\Delta X_1$ between $X_{L1}$ and $X_{R1}$;
- wherein the computer instructions are also for determining a magnetic read width $MRW_{FTP}$ by:
  - determining left and right best-fit lines along left and right sides of the bell-shaped signal curve, respectively;
  - identifying, along the left and the right best-fit lines, left and right side magnetic head positions $X_{L2}$ and $X_{R2}$ that correspond to a magnetic head signal level of zero;
  - finding a difference $\Delta X_2$ between $X_{12}$ and $XR_2$; and
  - finding a difference between $\Delta X_2$ and $MWW_{FTP}$.

13. The computer program product of claim 8,
- wherein the full track profile data comprises a plurality of signal amplitudes read across a track of a magnetic disk at a plurality of magnetic head positions;
- wherein the plurality of signal amplitudes form a bell-shaped signal curve when graphed over the plurality of magnetic head positions;
- wherein the computer instructions are also for determining left and right best-fit lines along left and right sides of the bell-shaped signal curve, respectively;
- wherein the computer instructions determine the initial write width value by determining a magnetic write track width $MWW_{FTP}$;
- wherein the computer instructions are also for determining a magnetic read width $MRW_{FTP}$ from the full track profile data;
- wherein the computer instructions determine the one or more side reading correction values, $C_{SRL}$ and $C_{SRR}$, by:
  - identifying left and right magnetic head positions $S_L$ and $S_R$, respectively, that correspond to where left and right side reading tails of the bell-shaped curve begin to deviate from the left and the right best-fit lines;
  - determining $C_{SRL}=\Delta Y_L/a_L$ and $C_{SRR}=\Delta Y_R/a_R$, where:

$\Delta Y_L=A_L(S_L)-(\partial A_L+\partial A_R)/2$ and $\Delta Y_R=A_R(S_R)-(\partial A_L+\partial A_R)/2$, $\partial A_L=A_L(S_L)-A_L(S_L-X)$ and $\partial A_R=A_R(S_R)-A_R(S_R+X)$,

- $A_L$ and $A_R$ are signal amplitudes corresponding to particular magnetic head positions,
- $a_L$ and $a_R$ are slopes of the left and the right best-fit lines, respectively, and
- $X=(MWW_{FTP}-MRW_{FTP})/2$.

14. The computer program product of claim 8, further comprising:
- wherein the full track profile data comprises a plurality of signal amplitudes read across a track of a magnetic disk at a plurality of magnetic head positions;
- wherein the plurality of signal amplitudes form a bell-shaped signal curve when graphed over the plurality of magnetic head positions;

wherein the computer instructions determine the initial write width value by determining a magnetic write width $MWW_{FTP}$ which includes the further acts of:
identifying a maximum value in the plurality of signal amplitudes;
identifying left and right side magnetic head positions $X_{L1}$ and $X_{R1}$ that correspond to half of the identified maximum value;
finding a difference $\Delta X_1$ between $X_{L1}$ and $X_{R1}$;
wherein the computer instructions are also for determining a magnetic read width $MRW_{FTP}$ by:
determining left and right best-fit lines along left and night sides of the bell-shaped signal curve, respectively;
identifying, along the left and the right best-fit lines, left and right side magnetic head positions $X_{L2}$ and $X_{R2}$ that correspond to a magnetic head signal level of zero;
finding a difference $\Delta X_2$ between $X_{L2}$ and $XR_2$;
finding a difference between $\Delta X_2$ and $MWW_{FTP}$;
wherein the computer instructions determine the one or more side reading correction values, $C_{SRL}$ and $C_{SRR}$, comprises the further acts of:
identifying left and right magnetic head positions $S_L$ and $S_R$ respectively, that correspond to where left and right side reading tails of the bell-shaped curve begin to deviate from the left and the right best-fit lines;
determining $C_{SRL}=\Delta Y_L/a_L$ and $C_{SRR}=\Delta Y_R/a_R$, where:

$\Delta Y_L = A_L(S_L) - (\partial A_L + \partial A_R)/2$ and $\Delta Y_R = A_R(S_R) - (\partial A_L + \partial A_R)/2$, $\partial A_L = A_L(S_L) - A_L(S_L - X)$ and $\partial A_R = A_R(S_R) - A_R(S_R + X)$, $A_L$ and $A_R$ are signal amplitudes corresponding to particular magnetic head positions,
$a_L$ and $a_R$ are slopes of the left and the right best-fit lines, respectively,
$X=(MWW_{FTP}-MRW_{FTP})/2$, and
wherein the computer instructions adjust the initial write width value by adjusting $MWW_{FTP}$ for determining MWW based on $MWW=MWW_{FTP}-C_{SRL}-C_{SRR}$.

15. A system for determining a magnetic write width of a magnetic head, the system comprising:
a spinstand having:
a magnetic disk;
a magnetic head for writing data to and reading data from the magnetic disk;
a read/write analyzer coupled to the spinstand;
a computer coupled to the read/write analyzer and the spinstand;
the computer being for:
obtaining, from the read/write analyzer, full track profile data for the magnetic head;
determining an initial write width value from the full track profile data;
determining one or more side reading correction values from the full track profile data; and
adjusting the initial write width value with the one or more side reading correction values for determining the magnetic write width.

16. The system of claim 15, further comprising:
,wherein the full track profile data comprises a plurality of signal amplitudes read across a plurality of magnetic head positions over a track of the magnetic disk.

17. The system of claim 15, further comprising:
wherein the full track profile data comprises a plurality of signal amplitudes read across a plurality of magnetic head positions over a track of the magnetic disk;
wherein the plurality of signal amplitudes form a bell-shaped signal curve when graphed over the plurality of magnetic head positions; and
wherein the computer determines the one or more side reading correction values by analyzing side reading tail data of the bell-shaped signal curve.

18. The system of claim 15, further comprising:
wherein the full track profile data comprises a plurality of signal amplitudes read across a plurality of magnetic head positions over a track of the magnetic disk;
wherein the computer determines the initial write width value by:
identifying a maximum value in the plurality of signal amplitudes; and
finding a difference between left and right magnetic head positions that correspond to half of the identified maximum value.

19. The system of claim 15, further comprising:
wherein the full track profile data comprises a plurality of signal amplitudes read across a plurality of magnetic head positions over a track of the magnetic disk;
wherein the plurality of signal amplitudes form a bell-shaped signal curve when graphed over the plurality of magnetic head positions;
wherein the computer is also for determining left and right best-fit lines along left and right sides of the bell-shaped signal curve, respectively;
wherein the computer determines the initial write width value by determining a magnetic write track width $MWW_{FTP}$;
wherein the computer is also for determining a magnetic read width $MRW_{FTP}$ from the full track profile data;
wherein the computer determines the one or more side reading correction values, $C_{SRL}$ and $C_{SRR}$, by:
identifying left and right magnetic head positions $S_L$ and $S_R$, respectively, that correspond to where left and right side reading tails of the bell-shaped curve begin to deviate from the left and the right best-fit lines;
determining $C_{SRL}=\Delta Y_L/a_L$ and $C_{SRR}=\Delta Y_R/a_R$, where:

$\Delta Y_L = A_L(S_L) - (\partial A_L + \partial A_R)/2$ and $\Delta Y_R = A_R(S_R) - (\partial A_L + \partial A_R)/2$, $\partial A_L = A_L(S_L) - A_L(S_L - X)$ and $\partial A_R = A_R(S_R) - A_R(S_R + X)$, $A_L$ and $A_R$ are signal amplitudes corresponding to particular magnetic head positions,
$a_L$ and $a_R$ are slopes of the left and the right best-fit lines, respectively, and
$X=(MWW_{FTP}-MRW_{FTP})/2$.

20. The system of claim 15, further comprising:
wherein the full track profile data comprises a plurality of signal amplitudes read across a plurality of magnetic head positions over a track of the magnetic disk;
wherein the plurality of signal amplitudes form a bell-shaped signal curve when graphed over the plurality of magnetic head positions;
wherein the computer determines the initial write width value by determining a magnetic write track width $MWW_{FTP}$ which includes the further acts of:
identifying a maximum value in the plurality of signal amplitudes;
identifying left and right side magnetic head positions $X_{L1}$ and $X_{R1}$ that correspond to half of the identified maximum value;
finding a difference $\Delta X_1$ between $X_{L1}$ and $X_{R1}$;

wherein the computer is also for determining a magnetic read width $MRW_{FTP}$ by:
  determining left and right best-fit lines along left and right sides of the bell-shaped signal curve, respectively;
  identifying, along the left and the right best-fit lines, left and right side magnetic head positions $X_{L2}$ and $X_{R2}$ that correspond to a magnetic head signal level of zero;
  finding a difference $\Delta X_2$ between $X_{L2}$ and $XR_2$;
  finding a difference between $\Delta X_2$ and $MWW_{FTP}$;
wherein the computer determines the one or more side reading correction values, $C_{SRL}$ and $C_{SRR}$, comprises the further acts of:
  identifying left and right magnetic head positions $S_L$ and $S_R$, respectively, that correspond to where left and right side reading tails of the bell-shaped curve begin to deviate from the left and the right best-fit lines;
  determining $C_{SRL} = \Delta Y_L / a_L$ and $C_{SRR} = \Delta Y_R / a_R$, where:

$\Delta Y_L = A_L(S_L) - (\partial A_L + \partial A_R)/2$ and $\Delta Y_R = A_R(S_R) - (\partial A_L + \partial A_R)/2$, $\partial A_L = A_L(S_L) - A_L(S_L - X)$ and $\partial A_R = A_R(S_R) - A_R(S_R + X)$, $A_L$ and $A_R$ are signal amplitudes corresponding to particular magnetic head positions,
  $a_L$ and $a_R$ are slopes of the left and the right best-fit lines, respectively,
  $X = (MWW_{FTP} - MRW_{FTP})/2$; and
wherein the computer adjusts the initial write width value by adjusting $MWW_{FTP}$ for determining MWW based on $MWW = MWW_{FTP} - C_{SRL} - C_{SRR}$.

* * * * *

UNITED STATES PATENT AND TRADEMARK OFFICE
CERTIFICATE OF CORRECTION

PATENT NO. : 6,680,609 B1
DATED : January 20, 2004
INVENTOR(S) : Fang et al.

It is certified that error appears in the above-identified patent and that said Letters Patent is hereby corrected as shown below:

Column 2,
Line 59, replace "mag-netic" with -- magnetic --.

Column 10,
Line 5, replace "XR$_2$" with -- X$_{R2}$ --.

Column 12,
Line 23, replace "X$_{12}$" with -- X$_{L2}$ --.
Line 23, replace "XR$_2$" with -- X$_{R2}$ --.

Column 13,
Line 3, replace "of." with -- of: --.
Line 18, replace "XR$_2$" with -- X$_{R2}$ --.
Line 61, replace ",wherein" with -- wherein --.

Column 15,
Line 11, replace "XR$_2$" with -- X$_{R2}$ --.

Signed and Sealed this

Ninth Day of March, 2004

JON W. DUDAS
*Acting Director of the United States Patent and Trademark Office*